UNITED STATES PATENT OFFICE.

CARL RACH, OF STAPLETON, NEW YORK.

FRUITED WORT EXTRACT.

1,194,230.  Specification of Letters Patent.  Patented Aug. 8, 1916.

No Drawing.  Application filed November 9, 1915.  Serial No. 60,585.

*To all whom it may concern:*

Be it known that I, CARL RACH, a subject of the King of Prussia, and residing at Stapleton, in the county of Richmond, in the State of New York, have invented a certain new and useful Fruited Wort Extract, of which the following is a specification.

My invention relates to the production of a new article of food from concentrated wort extract freed of malt sugar, (maltose) and combined with other suitable food or flavoring ingredients, such as the juices of fruit, like grape juice, raspberry juice, strawberry juice, or the juice of huckleberries, blackberries, apples, pears, peaches,—in fact the pressings of any juicy fruit. I may also take the fruit itself, thoroughly dry it, disintegrate it and combine it with the concentrated wort extract free of maltose and bring the mass into a dry form ready to be shaped into tablets. Or again, I may mix with the concentrated wort free of maltose comminuted nuts, chocolate, or other food ingredient suitable for the purpose.

It is well known that fruit juices may be concentrated, preferably with an addition of cane sugar, to syrupy consistency, bottled, pasteurized and preserved in this form for a relatively long period. If such a preparation were to be dried, however, by evaporization in a vacuum pan, the result could only be accomplished by the use of large quantities of sugar since the fruit juices have very little body, *per se*, and must be combined with some ingredient having a relatively heavy "body" of solids. Such a sugary concentrate, however, is extremely sweet and is not desirable for that reason in some instances.

I have found that a wort extract can be readily dried and that it forms an excellent body for combining with fruit juices and concentrating or desiccating. A plain wort extract, however, has a large percentage of maltose or malt sugar present and while this does not prevent drying under proper conditions, the product can be kept dry only with the greatest difficulty and by the exercise of many precautions since the maltose is extremely hygroscopic and upon exposure to air rapidly takes up the moisture in the air and becomes not only sticky but actually fluid to a syrupy condition, while, in the latter condition, it soon decomposes or ferments. I therefore propose to remove the maltose from the wort, while at the same time preserving the dextrins, albuminoids, mineral matters and other body giving constituents of the wort, and employ this wort extract in concentrated form as the body of my new food product.

In order to carry out the process successfully, I may proceed, for example, as follows: If fruit is the substance to be combined with the wort extract, it is first crushed in any suitable roller crusher, pressed, and the juices collected and put in cold storage to prevent fermentation or other chemical change taking place.

For the production of the wort extract, I proceed in the following way: I take a proportion of about one part of malt and three parts of unmalted cereals, (wheat flour, rice or corn grits, etc.) and use about a barrel of water for each 100 pounds of grain or malt. The unmalted cereals I cook and gelatinize and then cool off to about 190° F. and add the malted grain, bringing the temperature of the mass down to 165° to 170° F. This temperature is maintained until the starch present has been converted into dextrin and maltose, the conversion being carefully observed and watched by suitable tests so that the temperature may be raised to 180° F. and further diastatic action halted as soon as the conversion is complete, thus minimizing the quantity of maltose formed. The mass is then run into a filter press and the liquid wort from the press is run into a vacuum pan and there concentrated to a syrup. This syrup is now mixed with pure grain alcohol (of 80 per cent. to 90 per cent. purity), a sufficient quantity of the latter being employed to combine with the water and malt sugar present in the syrup. Preferably the alcohol is used in excess in order to completely combine with the water and at the same time completely dissolve the maltose in the syrupy wort. As soon as this operation is complete, I separate the alcoholic maltose solution from the residue which represents the whole extract of the malted and unmalted grains minus the hygroscopic malt sugar or maltose. This residue is then dried, driving off any remaining traces of the alcohol and water. After this has been accomplished, I pour upon the mass the fruit juices in any desired proportion. For example, with grape juice, 100 parts (by weight) grape juice to 25 parts (by weight) of residue. This mixture is then dried, preferably in vacuum, until it has reached the desired consistency. This may be a syrup, a paste, or a substantially dry mass adapted to be rolled and stamped into tablet form.

Instead of eliminating the maltose, I may, as an alternative disposition thereof, proceed as follows: After the wort extract has been concentrated to syrupy consistency, I heat it in the vacuum pan, while constantly stirring, to a temperature of 100° to 120° Réaumur, corresponding to a pressure of 20 to 40 pounds. To this end, the vacuum pan may be suitably arranged so that it may alternately serve as a pressure kettle. This treatment is continued for one to two hours until complete caramelization of the maltose takes place, thus converting the extract to a caramelized wort free of malt sugar. In this caramelized form the maltose is far less hygroscopic than in its normal state. This caramelized concentrated wort in syrupy form is then mixed with fruit juices and evaporated to syrup or other condition, as preferred. If dried, the mass may be cut into tablets which if exposed to the air are in no danger of becoming sticky or semi-liquid, as would be the case were the hygroscopic maltose present.

The uses to which the product may be put are various. The tablets may be dissolved in water to form a beverage or they may be eaten as a lozenge or other form. The pasty product may be used as a jam for the table or as a filler for cakes. The syrupy product may be used in much the same manner as molasses or maple syrup, differing from both, however, in that it is not sweet (except for the fruit sugars) and that it possesses more nutrition.

I do not limit my invention to the specific compositions above mentioned, which may be variously modified as will readily occur to those skilled in the art. Thus, a slight percentage of maltose—say up to 10 per cent.—may be permitted to remain in the product without materially affecting the result which I attain.

I claim as my invention:—

1. A food preparation having as an essential ingredient thereof a concentrated wort extract having less than ten per cent. maltose therein.

2. A food preparation having as an essential ingredient thereof a concentrated wort extract having less than ten per cent. maltose therein, together with a suitable food ingredient mixed therewith.

3. A food preparation having as an essential ingredient thereof a concentrated wort extract having less than ten per cent. maltose therein and a suitable flavoring substance mixed therewith.

4. A food preparation having as an essential ingredient thereof a concentrated wort extract having less than ten per cent. maltose therein and combined with a fruit preparation.

5. A food preparation having as an essential ingredient thereof a concentrated wort extract having less than ten per cent. maltose therein and in the form of a dry tablet.

6. A food preparation having as an essential ingredient thereof a concentrated wort extract having less than ten per cent. maltose therein flavored with fruit and in the form of a dry tablet soluble in water.

7. A food preparation having as an essential ingredient thereof, a concentrated wort extract having its maltose content substantially wholly withdrawn and the residue brought into dry form.

8. A food preparation having as an essential ingredient thereof, a concentrated wort extract having its maltose content substantially wholly withdrawn and the residue mixed with a fruit preparation and brought into dry form.

In testimony whereof I have signed my name to this specification, in the presence of two subscribing witnesses.

CARL RACH.

Witnesses:
L. H. GROTE,
WILLIAM ABBE.